United States Patent
Sadri et al.

[19]

[11] Patent Number: 5,865,581
[45] Date of Patent: Feb. 2, 1999

[54] FREE RUNNING PREVAILING TORQUE NUT

[75] Inventors: Shahriar M. Sadri, San Clemente; Hai-Tao Wang; Ramon L. Hurd, both of Fountain Valley, all of Calif.

[73] Assignee: Huck International, Inc., Tucson, Ariz.

[21] Appl. No.: 838,235

[22] Filed: Apr. 16, 1997

[51] Int. Cl.⁶ .............................. F16B 31/00; F16B 33/04; F16B 37/08

[52] U.S. Cl. ................. 411/5; 411/270; 411/432; 411/433

[58] Field of Search ..................... 411/3–5, 267, 411/270, 235, 237, 432, 433, 437

[56] References Cited

U.S. PATENT DOCUMENTS

| | | |
|---|---|---|
| 632,422 | 9/1899 | McLauglin . |
| 661,655 | 11/1900 | Bryce . |
| 783,572 | 2/1905 | Gibbs . |
| 867,351 | 10/1907 | Doelp . |
| 1,183,556 | 5/1916 | Green . |
| 1,303,784 | 5/1919 | Emery . |
| 1,464,591 | 8/1923 | Weichold, Jr. . |
| 1,838,605 | 12/1931 | Youlten . |
| 1,850,768 | 3/1932 | Peirce . |
| 1,928,769 | 10/1933 | Teetor . |
| 1,928,982 | 10/1933 | Rosenbaum . |
| 2,380,994 | 8/1945 | Pummill . |
| 2,396,661 | 3/1946 | Keller et al. . |
| 2,520,259 | 8/1950 | Pummill . |
| 2,529,854 | 11/1950 | Tarwater . |
| 2,605,804 | 8/1952 | Woodling ................. 411/270 |
| 2,796,907 | 6/1957 | Dumas . |
| 2,895,367 | 7/1959 | Nagy . |
| 2,955,505 | 10/1960 | Schuster . |
| 3,216,304 | 11/1965 | James et al. . |
| 3,225,809 | 12/1965 | Peak, Sr. .............................. 411/270 X |
| 3,390,906 | 7/1968 | Wing . |
| 3,465,637 | 9/1969 | Cushman et al. . |
| 3,578,367 | 5/1971 | Harvill et al. . |
| 3,683,740 | 8/1972 | Martin . |
| 3,887,990 | 6/1975 | Wilson . |
| 4,037,515 | 7/1977 | Kesselman . |
| 4,143,579 | 3/1979 | Ziaylek, Jr. . |
| 4,221,152 | 9/1980 | Jason . |
| 4,326,825 | 4/1982 | Volkmann et al. . |
| 4,427,326 | 1/1984 | Hobson et al. . |
| 4,485,510 | 12/1984 | Hatter . |
| 4,518,295 | 5/1985 | Matuschek . |
| 4,557,649 | 12/1985 | Jeal . |
| 4,729,703 | 3/1988 | Sato ............................................ 411/5 |
| 4,957,401 | 9/1990 | Hatter . |
| 5,090,852 | 2/1992 | Dixon . |
| 5,315,755 | 5/1994 | Fulbright et al. . |
| 5,562,379 | 10/1996 | Rausch et al. . |

*Primary Examiner*—Neill Wilson
*Attorney, Agent, or Firm*—Harness, Dickey & Pierce P.L.C.

[57] ABSTRACT

A threaded fastener including a nut and a bolt with the nut including a ring section and a nut section with the nut section having a main body portion and a neck portion with the neck portion adapted to be moved into the ring section and to be moved radially inwardly such that the threads in the neck portion are moved into compressive engagement with the engaged threads of the bolt to provide prevailing torque structure resisting loosening of the nut member from the bolt.

34 Claims, 5 Drawing Sheets

FREE RUNNING PREVAILING TORQUE NUT

SUMMARY BACKGROUND OF THE INVENTION

The present invention relates to a fastener system including a threaded fastener having a prevailing torque feature.

Threaded fastener assemblies are used in many applications for aerospace and industrial construction. Such assemblies include threaded bolts or studs and nut members having a matching thread form. In applications subject to vibration or repeated load fluctuations such threaded fastener assemblies have been known to lose their retention torque and to loosen. To inhibit such action, threaded fastener assemblies have been modified to provide a prevailing torque feature to resist loosening and loss of clamp of the workpieces or articles which are joined. Frequently, a prevailing torque feature has been attained by providing one of the mating thread forms with a distorted portion such that, upon engagement between the distorted thread portion and the undistorted thread form, the nut member and the stud or bolt will be additionally held together under a prevailing torque by a thread interference which will resist untorqing and hence resist loosening from vibration.

With standard, non-distorted thread forms, the nut member is free running at low torque values onto the bolt or stud until workpiece engagement and initial clamp or preload on the workpieces. Thereafter the final clamp load attained relative to the magnitude of applied torque is resisted mainly by the inherent friction between the engaged portions of the rotating members under load. This is not the case with threaded fasteners having a distorted, torque prevailing thread form. Here once the distorted thread portion is engaged by the mating threads the nut member is no longer free running and the clamp load of the workpieces being fastened relative to the magnitude of the applied torque is reduced. While the distortion of the thread form is often placed at the outer or trailing end of the nut, this still restricts the free running capability of the nut member onto the stud or bolt and the magnitude of initial preload and final clamp load relative to the applied torque. In addition the mating engagement between the distorted and undistorted threads may be somewhat grip sensitive over the grip range, i.e. with grip range being the variation in total thickness of workpieces, from a maximum grip or total thickness to a minimum grip or total thickness, and to be secured together by a single sized fastener.

The present invention provides a unique nut member which is free running and permits clamping of the workpieces up to a preselected first magnitude of torque. The first magnitude of torque is selected to provide a desired magnitude of initial preload on the workpieces. After this first magnitude of torque is attained in a free running step, a radially compressive force is induced whereby a frictional load is imposed on the threads engaged between the nut member and the bolt or stud. The torque and hence compressive force is increased until a second preselected magnitude of torque is attained at which the installation is completed. The result is a fastened joint with the workpieces held together under a preselected magnitude of final clamp load and with the engaged threads of the nut and bolt or stud of the installed fastener held together under a high compressive load resulting in a high prevailing torque which provides resistance to removal and hence a desired resistance to loosening from vibration or other cyclic loading.

In a preferred form of the present invention the nut member is of a one piece construction with the initial preload being determined by a frangible portion and with the compressive load occurring after the frangible portion has fractured upon attainment of the first magnitude of torque.

The free running capability of the nut member of the present invention is desirable for use in aerospace applications including applications utilizing workpieces made of composite materials.

The unique nut member of the present invention can be utilized with a variety of thread forms including generally standard thread forms available on existing bolts or studs.

The free running capability of the unique nut member of the present invention will be substantially uniformly operative over the grip range of the related fastener.

The free running capability and resultant prevailing torque characteristic of the unique nut member are desirable for many aerospace and non-aerospace applications.

Thus it is an object of the present invention to provide a unique threaded fastener having a prevailing torque characteristic.

It is another object of the present invention to provide a unique threaded fastener including a free running nut adapted to provide a preselected magnitude of initial preload without interference or high frictional loads between the engaging threads and to provide a prevailing torque characteristic after attainment of the initial preload.

In addition it is significant that fasteners used in aerospace applications, with or without a torque prevailing feature, be of a lightweight construction and of minimal size upon final installation.

Thus it is still another object of the present invention to provide a unique threaded fastener including a free running nut which also provides a prevailing torque feature upon installation and which is of a lightweight construction.

Other objects, features, and advantages of the present invention will become apparent from the subsequent description and the appended claims, taken in conjunction with the accompanying drawings, in which:

DESCRIPTION OF EMBODIMENTS OF THE INVENTION

Figure 1:
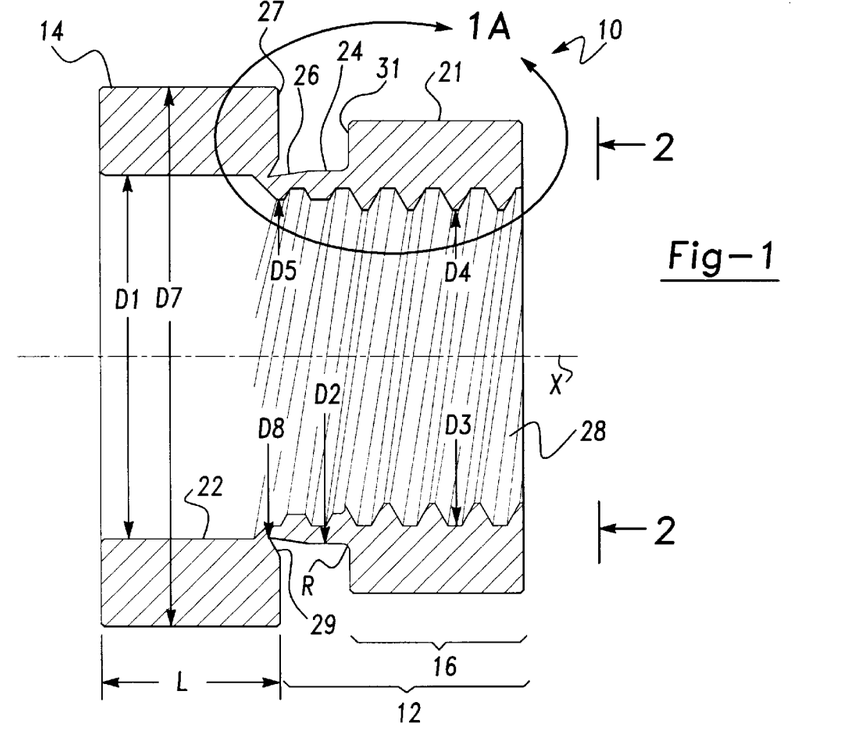
FIG. 1 is a side elevational, sectional view of one form of nut member embodying features of the present invention.
Figure 1A:
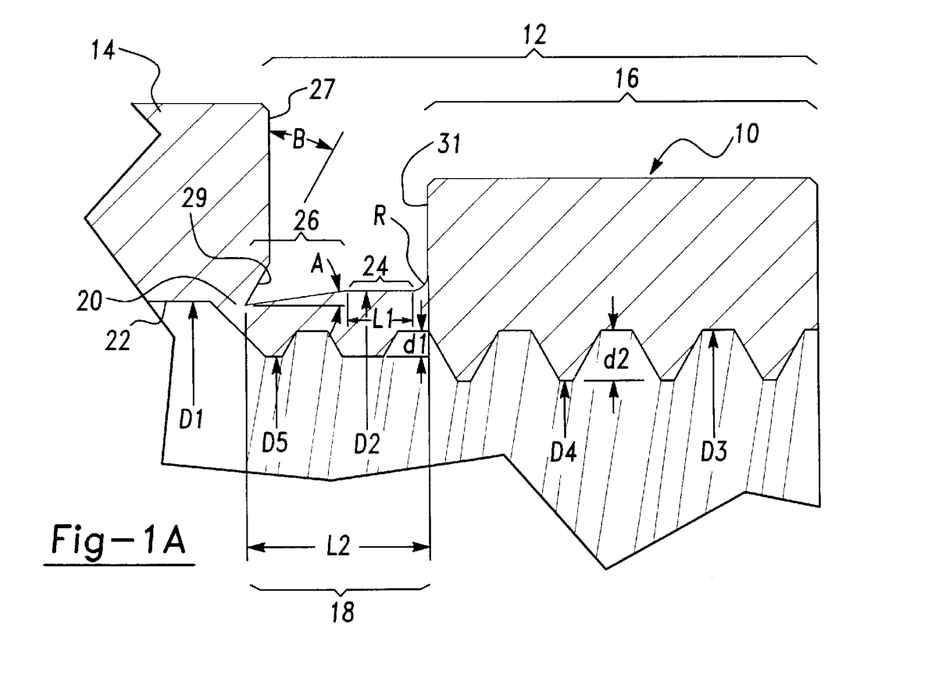
FIG. 1A is a fragmentary, sectional view to enlarged scale of the portion of the nut member of FIG. 1 in the encircled Area 1A.
Figure 2:
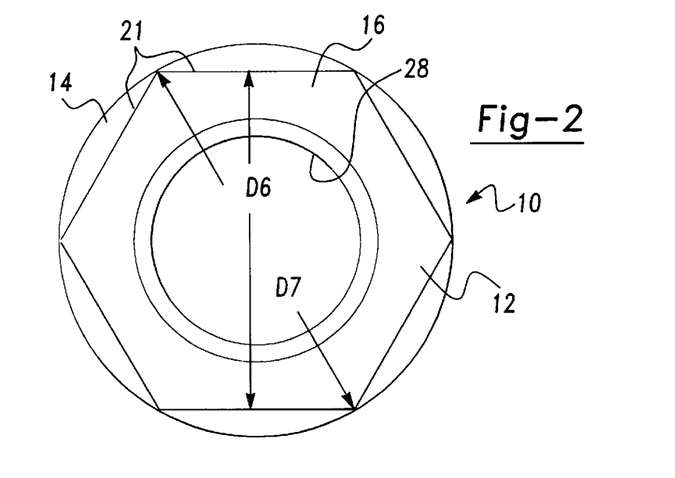
FIG. 2 is an end view of the nut member of FIG. 1 taken generally in the direction of the Arrows 2—2.

Looking now to FIGS. 1, 1A and 2 of the drawings, a nut member 10 is shown and includes a nut section 12 and a locking ring section 14. The nut section 12 includes a main body portion 16 and a neck portion 18 of substantially reduced section. The nut section 12 is integrally connected to the inner end of the ring section 14 by a frangible rib 20 at the outer end of the neck portion 18. In the embodiment of FIGS. 1, 1A and 2, the main body portion 16 has a hex shaped outer surface 21 to facilitate engagement by a socket tool of a well known or standard construction whereby torque can be applied to the nut member 10 (see FIG. 2). The ring section 14 is of an annular configuration having a generally circular cross-section with a smooth through bore 22 of a preselected diameter D1.

Looking to FIGS. 1 and 1A, the neck portion 18 has a generally, axially straight segment 24 of a uniform outside diameter D2. The outside diameter D2 is greater than the diameter D1 of the locking ring bore 22. This provides a preselected interference for a purpose to be described. The straight segment 24 is connected to the main body portion 16 by a fillet radius R. A tapered segment 26, having an outer, tapered surface, connects the straight segment 24 to the frangible rib 20.

The nut section 12 has a threaded through bore 28 extending through the main body portion 16 and neck portion 18. The root diameter D3 of the thread of bore 28 is less than the diameter D1 of the bore 22 of ring section 14. Thus a mating threaded male member can pass through the ring bore 22 with clearance. The crest of the thread in bore 28 has a diameter D4 in the portion of the bore 28 in the main body portion 16 and is truncated to a larger diameter D5 to provide a reduced radial depth d1 of the thread form in the neck portion 18 for a purpose to be described.

The outer surface of the leading end of the tapered segment 26 extends axially and radially inwardly from the inner face or surface 27 of the ring section 14 to the frangible rib 20; at the same time an angled, annular surface extends from the inner face 27 radially inwardly to the end portion of the tapered segment 26 to define therewith an annular, angularly extending notch 29. As will be seen the notch 29 is angled such that upon engagement between the inner face or surface 27 of ring section 14 and the confronting inner surface 31 of the main body portion 16 there will be minimal or no engagement with the fillet radius R. In this way localized bearing stress at the fillet radius R will be avoided. At the same time the depth of notch 29 can be selected to facilitate fracture of the rib 20 at the desired magnitude of torque. It should be noted that the size of the fillet radius R can vary depending upon the strength and elastic properties of the material of the nut member 10. Thus in some cases when the nut member 10 is made of a high strength material, such as a titanium alloy, having desired elastic properties the size of the fillet radius R can be reduced and the notch 29 can be essentially eliminated.

Figure 3:
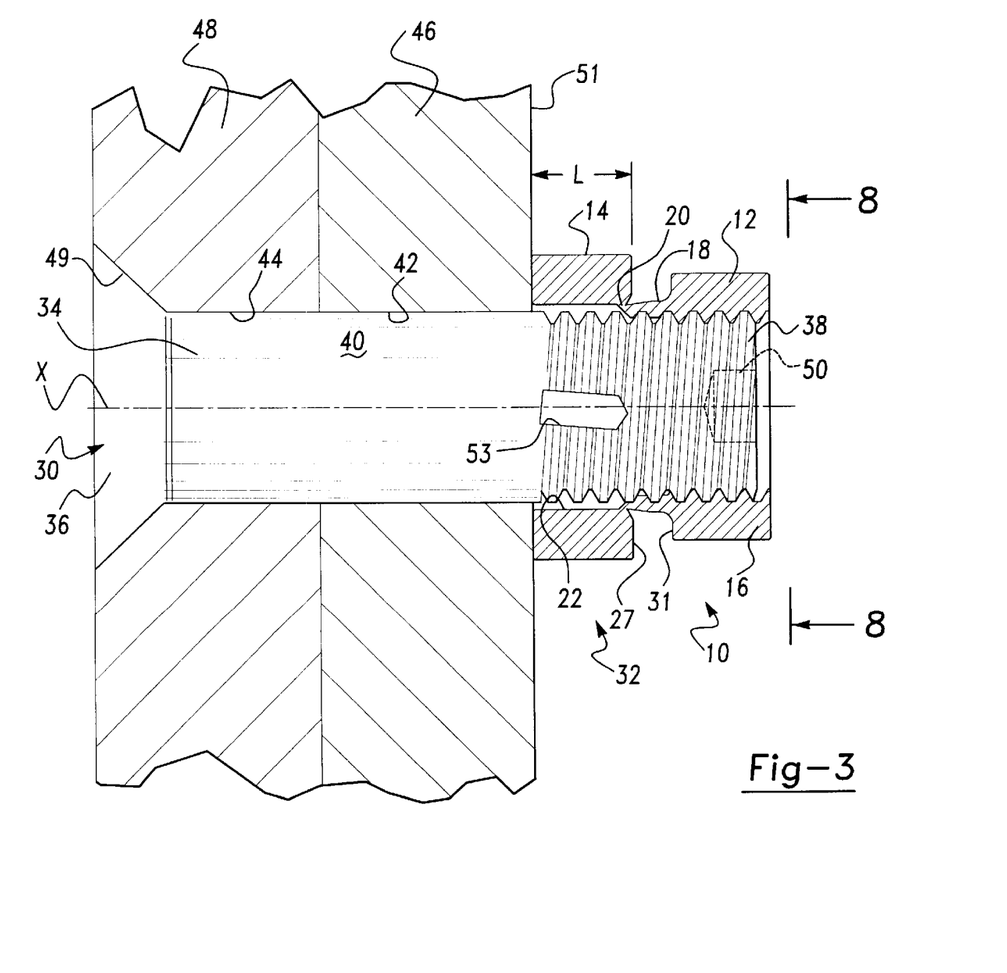
FIG. 3 is a side elevational view, with the nut member shown in section, depicting the nut member of FIGS. 1 and 2 in assembly relationship with a bolt and workpieces to be secured together after initial preload of the workpieces by the fastener assembly with the workpieces representing a maximum grip condition.
Figure 4:
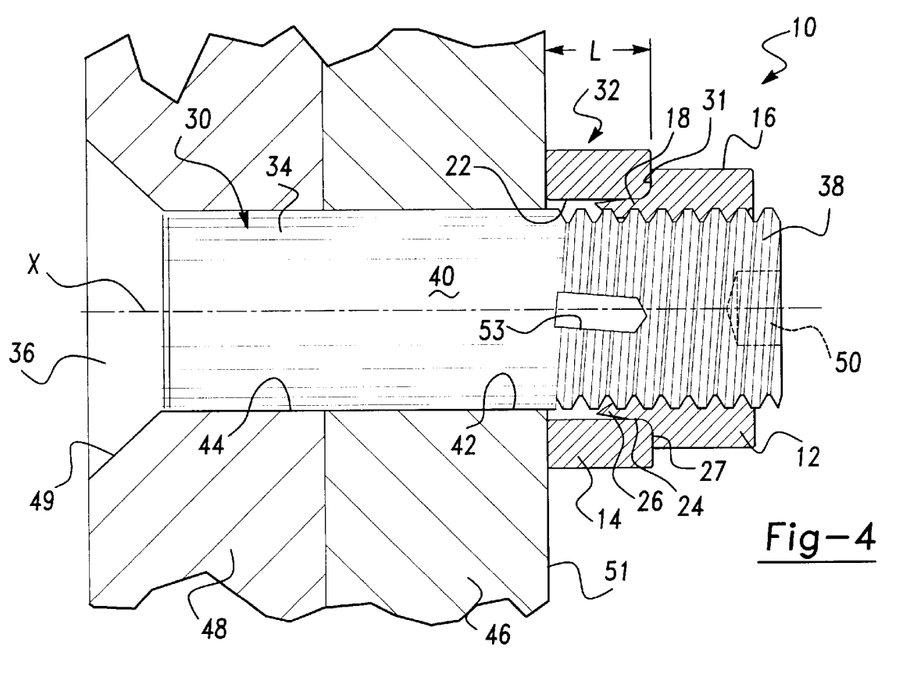
FIG. 4 is a side elevational view similar to FIG. 3 depicting the fastener assembly of the nut member and the bolt in the final installed condition for the workpieces of maximum grip for that fastener assembly.

Looking now to FIGS. 3 and 4, the nut member 10 is shown in assembled relationship with a bolt 30 to define a fastener assembly 32 with the fastener assembly 32 shown in the process of securing workpieces 46 and 48 together. The bolt 30 has an elongated shank 34 with an enlarged countersunk head 36 at one end and a threaded portion 38 at the opposite end. A smooth shank portion 40 connects the threaded portion 38 with the bolt head 36. The shank 34 of the bolt 30 is adapted to extend through aligned openings or bores 42 and 44 in the workpieces 46 and 48, respectively. Bore 44 has a countersunk portion 49 adapted to matably receive the countersunk head 36. The threaded shank portion 38 has a substantially uniform thread form adapted to matingly engage the threads of the threaded bore 28 of the nut section 12. As shown in FIG. 3, the nut member 10 has been threadably secured onto the threaded portion 38 by torque being applied via the hex shaped main body portion 16 by a suitable tool (not shown) to clamp the workpieces 46 and 48 together under a preselected magnitude of initial preload or clamp load. Note that at this juncture the locking ring section 14 is still connected to the neck portion 18 by the frangible rib 20.

In installing the fastener assembly 32, the nut member 10 can be applied to the bolt 30 by a suitable tool or by hand to initially thread the nut section 12 onto the threaded portion 38 of the bolt shank 34. Next the tool can be used for the application of additional torque and for the final installation of the fastener assembly 32. With the nut member 10 now in engagement with the outer surface 51 of the workpiece 46, a desired magnitude of initial clamp load or preload is attained by the application of a first predetermined magnitude of torque. Up to this point the nut member 10 is essentially free running on the threaded portion 38 of the bolt shank 34. As the magnitude of torque is increased to a second predetermined magnitude, the frangible rib 20 shears and the neck portion 18 moves axially into the bore 22 of the locking ring section 14. As the neck portion 18 moves axially into ring bore 22 the leading end of the tapered segment 26 is urged radially inwardly into compressive engagement with the mating threads on the threaded bolt shank portion 38. As the magnitude of applied torque is increased further the complete tapered segment 26 and then the straight segment 24 are moved into the bore 22 to provide a tight, compressive engagement with the mating bolt threads. After the straight segment 24 has been moved into the bore 22, the final, predetermined magnitude of torque can be sensed and the operation discontinued upon attainment of that magnitude. In a preferred form of the invention the straight segment 24 is moved completely into the ring bore 22 bringing the confronting surfaces 27 and 31 of locking ring section 14 and nut section 12, respectively, into engagement as shown in FIG. 4. Such a structure in which engagement of confronting surfaces 27 and 31 occurs provides for a ready means of visual inspection and verification that a desired magnitude of torque has been applied and hence a desired magnitude of final clamp load on the workpieces 46 and 48 has been attained. This also provides assurance that the lock between the engaged threads is complete and is maximized. It is also believed desirable that the helical threads in the neck portion 18 extend for at least around two thread pitches.

The nut section 12 can be made of a somewhat softer material than that of the bolt 30. Thus the threads in the neck portion 18 can deform slightly to the shape of the mating threads on the threaded shank portion 38 of the bolt 30 in response to the compressive engagement as the neck portion 18 is moved axially into the ring bore 22. At the same time the engaged threads of the shank portion 38 of the bolt 30 will remain substantially undistorted.

It is common in aerospace applications to utilize a sealant between the workpieces being joined to provide a fluid tight joint. In such instance, the fracture load of the frangible rib 20 can be selected to be of a magnitude sufficient to permit the workpieces 46, 48 to be pulled together with a sufficient preload and without fracture of the rib 20 to squeeze out excess sealant located therebetween. In this regard, it is a common procedure to first apply a clamp load to the workpieces 46, 48 of a magnitude sufficient to pull the workpieces 46, 48 together into engagement to expel excess sealant therebetween and to let the joint set for a preselected time period and then return and apply additional torque to the nut member 10 through the nut section 12 to attain the final clamp load. In this instance the rib 20 can be constructed to remain in tact and hence to not fracture during the first step. In the second step, and after the joint has been given time to settle, torque is again applied to the nut section 12. The rib 20 is fractured at a torque load which is of a greater magnitude than that applied in the first step and as additional torque of further increased magnitude is applied the neck portion 18 is moved fully into the ring bore 22 to complete the installation. It should be understood, of course, that the installation could be done in one step, with or without sealant, rather than in the two steps noted above. It should also be understood that the rib 20 could be constructed to fracture during this first step of clamp for sealant squeeze out with the occurrence of fracture providing an indication or signal to the operator to cease the application of additional torque at that time. Such sealants are typically paste-like materials such as PR1776B2 by Courtaulds Aerospace which is a manganese dioxide dispersion class sealant.

In order to facilitate the application of torque between the nut member 10 and the bolt 30, the outer end of the shank 34 can be provided with a hex or other irregularly shaped bore 50 which can receive a similarly shaped rod on the installation tool (not shown). The rod is fixed from rotation such that only the hex shaped socket portion of the tool will be rotated thereby preventing the nut member 10 and bolt 30 from spinning together in the workpiece bores 42, 44. Such spinning could result in undesirable galling of the workpiece bores such as bores 42, 44. The details of such a tool are within the purview of one skilled in the art and do not constitute a part of the present invention and thus have been omitted for purposes of simplicity.

As can be seen from FIG. 4 at this point there is complete engagement of substantially all of the threads in the threaded bore 28 of the nut section 12 with the threads of the threaded portion 38 of the bolt 30.

As noted, the crests of at least some of the threads from the leading end of the neck portion 18 rearwardly are truncated. In one form, the crests in the neck portion 18 have been reduced to a radial depth d1 of around one half of the normal radial depth d2 of the full threads in the remainder of the nut section 12 including the main body portion 16. This serves several purposes. First, it facilitates the initial threaded engagement with the threaded shank portion 38 of the bolt 30 while inhibiting cross threading. Secondly, the truncated thread in combination with the tapered thickness of the tapered segment 26 of the neck portion 18 assists in promoting the initial axial movement of the neck portion 18 into the bore 22 of ring section 14 and the development of a high prevailing torque by its radial compression without excessive friction and without permanent distortion of the engaging bolt threads. It is believed that a truncation or reduction in radial depth such that depth d1 is between from around 25% to around 75% of the normal radial depth d2 of the crests will provide such beneficial results. In one form of the invention a reduction in radial depth of around 50% was desirable. By reducing the radial depth of the crests, the neck portion 18 is made more compliant thereby facilitating the desired radial compression and the attainment of the high prevailing torque characteristic of the fastener. In addition, such reduction in radial depth of the crests at the leading end of the threads in the neck portion 18 and the resultant compliant structure facilitates use of the nut member 10 in applications where the surface 51 of the workpiece 46 is somewhat angulated relative to the axis X of the nut member 10. By contrast the remainder of the threads of the nut section 12, including the main body portion 16, are of the normal thread depth d2 which is substantially equal to the radial depth of the mating threads of the threaded bolt portion 38. At the same time, the ring section 14 is constructed to have a sufficient radial wall thickness whereby radial expansion of the ring section 14 is inhibited. In this regard, in some instances the straight segment 24 of the neck portion 18 can be provided with at least one thread pitch of a non-truncated helical thread of full radial depth d2 at its trailing end proximate the inner surface 31. (See FIG. 9)

It can be seen that the radially outer surface of the tapered segment 26 at its connection with the frangible rib 20 starts with an outside diameter D8 which is slightly smaller than the diameter D1 of the ring section bore 22. The slight reduction in the initial, lead in diameter D8 promotes the initial movement of the tapered segment 26 into ring bore 22 in response to the increasing axial load and thus inhibits buckling of the tapered segment 26 after the fracture load of the frangible rib 20 is attained. The taper angle A is selected in part to be sufficient to provide the leading end of tapered segment 26 with adequate initial frictional engagement with the ring bore 22 to inhibit spring back or loss of clamp upon initial severance of the frangible rib 20. In one form, the outer surface of the tapered segment 26 tapers at an angle A of around 8° relative to the central axis X and extends from the smaller diameter D8 at its leading end to the larger diameter D2 of the straight segment 24. In this regard it is believed that the taper angle A can be varied from between around 3° to around 13° and preferably between around 6° to around 10°. The straight segment 24 can extend for generally between around 10% to around 75% of the length L2 of the neck portion 18. This will depend to some extent on the material and overall size of the nut member 10.

It is also believed to be advantageous to provide the neck portion 18 with the straight segment 24. In this regard the compressive engagement of the straight segment 24 with the surface of ring bore 22 provides a greater, more uniform area of surface to surface frictional engagement than if only a tapered surface such as the tapered surface of tapered segment 26 were engaged with ring bore 22. At the same time at least a portion of the threads in the straight segment 24 can be of full radial depth or less truncated than those in the tapered segment 26 resulting in a greater magnitude of interference with the engaged threads on threaded portion 38. (See FIG. 9). This increased surface engagement and compressive load results in a higher prevailing torque. In addition, however, the compressive load holding the prevailing torque is maintained in part by the engagement between the straight, substantially non-tapered surfaces thereby effectively resisting loosening from vibration which might occur if the only holding force was from a tapered surface engagement. In this regard final engagement between the axially straight non-tapered surfaces on the straight segment 24 and the ring bore 22 will enhance the vibration resistance of the nut member 10 to loosening from the bolt 30 in a finished installation. The axial length L1, however, of the straight segment 24 is maintained at a desirable length such that, upon installation, it is moved over its full length into the bore 22 whereby confronting surfaces 27 and 31 are brought into engagement with each other.

It is also believed that provision of the straight segment 24 for engagement with the substantially straight surface of ring bore 22 provides a more predictable magnitude of final clamp load than if the neck portion 18 were only tapered. This is in part the result of the fact that the final clamp load will to some extent be determined by the magnitude of relative axial force between the bolt 30 and nut member 10 required to radially expand the ring section 14 as the straight segment 24 is moved axially into the ring bore 22.

In order to provide an additional lock between the nut section 12 and bolt 30, an axial slot or groove 53 can be provided in the threaded portion 38 of the bolt shank 34 (see FIGS. 3 and 4). Thus as the neck portion 18, and especially the straight segment 24, reaches its final position fully within the ring bore 22 a portion of the material will be deformed into the groove 53 resulting in an additional, mechanical locking action between the bolt 30 and nut member 10. It is believed that the effectiveness of the lock in the slot 53 is enhanced if the slot 53 is angulated to be at around 90° to or in quadrature with the helix angle of the thread in the threaded shank portion 38. The use of such an axial locking slot 53 is optional since a high level of prevailing torque will be achieved even in the absence of the slot 53.

In one form of the embodiment of FIGS. 1-4, with the diameter D1 of the lock ring bore 22 being around 0.338 inches the diameter D2 of straight segment 24 was selected to be around 0.345 inches. This resulted in a radial interference of the straight segment 24 with bore 22 of around 0.0035 inches per radial side. It is believed that a radial interference of between around 0.001 inches to around 0.005 inches per radial side will provide a desired magnitude of compressive force between the engaged threads to attain the desired magnitude of prevailing torque. In this regard the bore 22 may be formed with a slight taper to facilitate manufactureof the ring section 14 by cold forming or heading. Since the ring section 14 is formed with a generally uniform radial wall thickness the outer surface will be similarly angulated. Thus the bore 22 can taper diametrically from a larger diameter at its open end to a slightly smaller diameter at its end proximate the neck portion 18. The overall change in diameter for the embodiment noted above would be around 0.006 inches. This can be readily accommodated by the neck portion 18 in view of the engagement of bore 22 by straight segment 24 and further in view of the fact that at final installation the neck portion 18 does not extend into bore 22 for its full length, see FIGS. 4 and 5.

As noted the notch 29 is angulated such that surfaces 27 and 31 can be engaged with little or no engagement of the surface 27 with the fillet radius R. In the form of the nut member 10 as described and made of 7075-T73 Aluminum, the overall length L2 of the neck portion 18 was around 0.075 inches with the length L1 of the straight segment 24 up to the beginning of fillet radius R being around 0.013 inches.

The radius R at the juncture between the neck portion 18 and the body portion 16 is selected to provide a balance between the compressive hoop strength of the neck portion 18 and the stress concentration factor at the fillet radius R. A large fillet radius R will resist radial compression of the neck portion 18 as it moves into the bore 22. In this regard the notch 29 acts to minimize this resistance since it provides a clearance for at least a portion of the fillet radius R as it moves into the bore 22. Too small of a fillet radius R could result in an undesirably high level of stress concentration especially where the nut member 10 is made of lower strength materials such as aluminum. In addition such a small fillet radius R could lower the tensile strength of the nut section 12 at that point. In the one form of the invention with the nut member 10 made of aluminum 7075-T73 and with the diameter D2 of the straight segment 24 as noted and with the diametrical dimension D6 across the flats of the hex of around 0.437 inches, a radius R of around 0.030 inches was found satisfactory. The angle B of outer surface of notch 29 relative to inner face or surface 27 was selected to be around 20°. The flats of the outer surface 21 of nut section 12 are diametrically spaced by a diameter D6 which is less than the diameter D7 of the outer surface of the ring section 14. At the same time opposite corners of the hex surface 21 are generally diametrically spaced slightly less than the distance D7. This geometry facilitates the manufacture of the nut member 10.

In the form of the invention as noted with the nut member 10 made of a 7075-T73 aluminum and for a -10 diameter size a thread form of 5/16-24UNJF-3B was used. The bolt 30 was provided with a matching thread form on the threaded shank portion 38.

As previously noted where the nut member 10 is made of a relatively high strength material the size of radius R can be minimized and the notch 29 can be essentially eliminated. Thus for nut member 10, being generally of the same size as that described for the aluminum version, and being made of a 3Al-2.5V Titanium, the radius R can be minimized to around 0.005 inches. At the same time the notch, such as notch 29, can be eliminated. Thus the fracture load of the rib 20 will be determined by design factors independently of any notch such as notch 29. In an aerospace application, the mating bolt 30 could be of a 6Al-4V Titanium material to provide a high strength fastener assembly 32. As noted the high prevailing torque feature is provided with substantially little or no permanent distortion of the mating threads especially in constructions in which the locking slot 53 is omitted. Thus, if desired, the fastener assembly 32 can be threadably separated and removed from the workpieces 46 and 48 after installation. Such threaded disassembly can be achieved even with the use of the locking slot 53 with the initial breakaway torque being somewhat higher.

It is desirable that the fastener assembly 32 be utilized to secure workpieces, such as workpieces 46 and 48, over a reasonable grip range. The grip range of a fastener assembly, such as fastener assembly 32, is defined, as previously noted, as the difference between the maximum and minimum total thicknesses of workpieces, such as workpieces 46 and 48, which the same fastener assembly is capable of securing together. In FIGS. 3 and 4, the fastener assembly 32 is shown securing workpieces 46 and 48 which are of the maximum total thickness or maximum grip for that fastener assembly 32. In this regard it can be seen that the smooth shank portion 40 is of a length sufficient to extend from the bolt head 36 for the remaining full length of the total thickness of the workpieces 46 and 48. In this application the length of the threaded portion 38 will be minimized to provide full engagement with substantially all of the threads of the nut section 12 at the initial clamp up of the workpieces 46 and 48 as shown in FIG. 3 and full engagement at final clamp up as shown in FIG. 4. At the same time essentially none of the threaded portion 38 will be located within the workpiece bore 42

Figure 5:
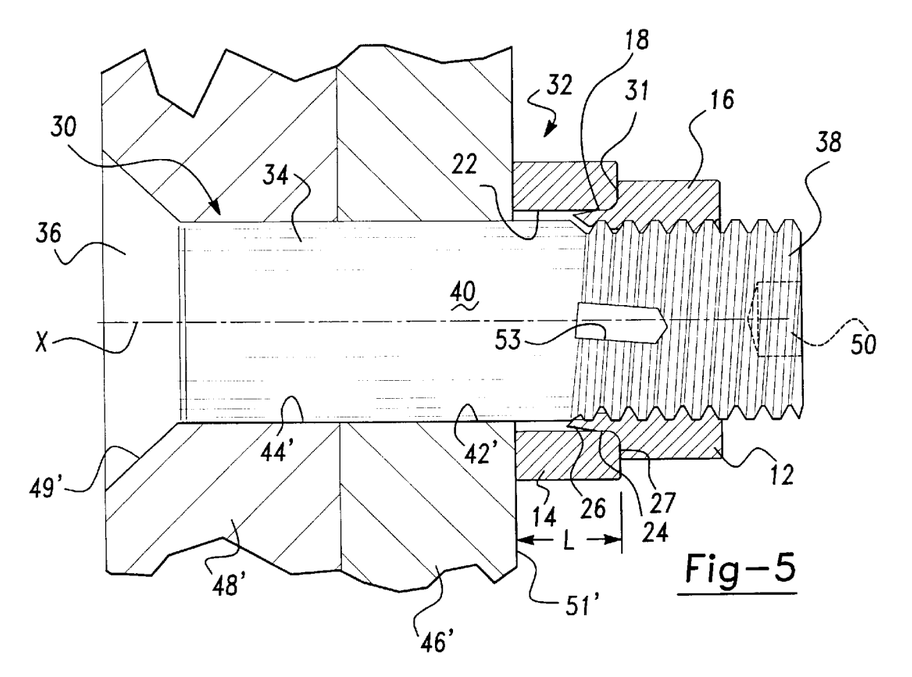
FIG. 5 is a side elevational view similar to FIG. 4 depicting the same fastener assembly of the nut member and bolt member of FIG. 4 in a final installed condition for workpieces of a minimum grip condition for that same fastener assembly.

By contrast, in FIG. 5 the fastener assembly 32 is shown in final assembly of workpieces having the minimum total thickness. Thus in the description of FIG. 5 the components of the fastener assembly 32 are given the same numeral designations as in FIG. 4 while the workpieces of different thickness and associated components are given the same numeral designations with the addition of a prime.

Thus in FIG. 5 the workpieces 46' and 48' have a total thickness which is at the minimum total thickness of the grip range of the fastener assembly 32. In this application, the smooth shank portion 40 of the bolt 30 will extend past the outer surface 51' of workpiece 46' and partially into the bore 22 of the ring section 14. It can be seen that with the fastener assembly 32 completely installed as shown in FIG. 5, the innermost end of the neck portion 18 will still be in a slight clearance from the adjacent end of the smooth shank portion 40 of the bolt 30. Thus the axial length L of the ring section 14 is selected relative to the length of the neck portion 18 and the grip range of the workpieces, such as 46, 48 for maximum grip and 46', 48' for minimum grip, whereby the innermost end of the neck portion 18 will not engage and thus be in clearance relationship with the confronting terminating end of the smooth shank portion 40 of the bolt 30. In order to maintain the size of the ring section 14 and hence its length L at a minimum, the length L is selected such that upon final installation of the fastener assembly 32 with workpieces 46', 48' of a minimum grip or minimum total thickness, the innermost end of the neck portion 18 will be in only a slight or minimal clearance with the confronting end of the smooth shank portion 40. It is understood, of course, that in some applications a minimal engagement between such innermost and confronting ends could be tolerated.

In this regard it should be noted that even if the length of threaded portion 38 of the bolt 30 were extended, the axial length of the neck portion 18 still would be selected to be no greater than the axial length L of the ring section 14. Thus in such a construction when the neck portion 18 is fully located within the bore 22 of ring section 14 it will not engage the confronting surface such as surface 51 of workpiece 46. This is especially significant in such applications in which engagement of the neck portion 18 with the surface 51 of workpiece 46 could create a high stress concentration around the associated workpiece opening 42 and/or inhibit engagement of the confronting surfaces such as surfaces 27 and 31 of the nut member 10.

Figure 6:
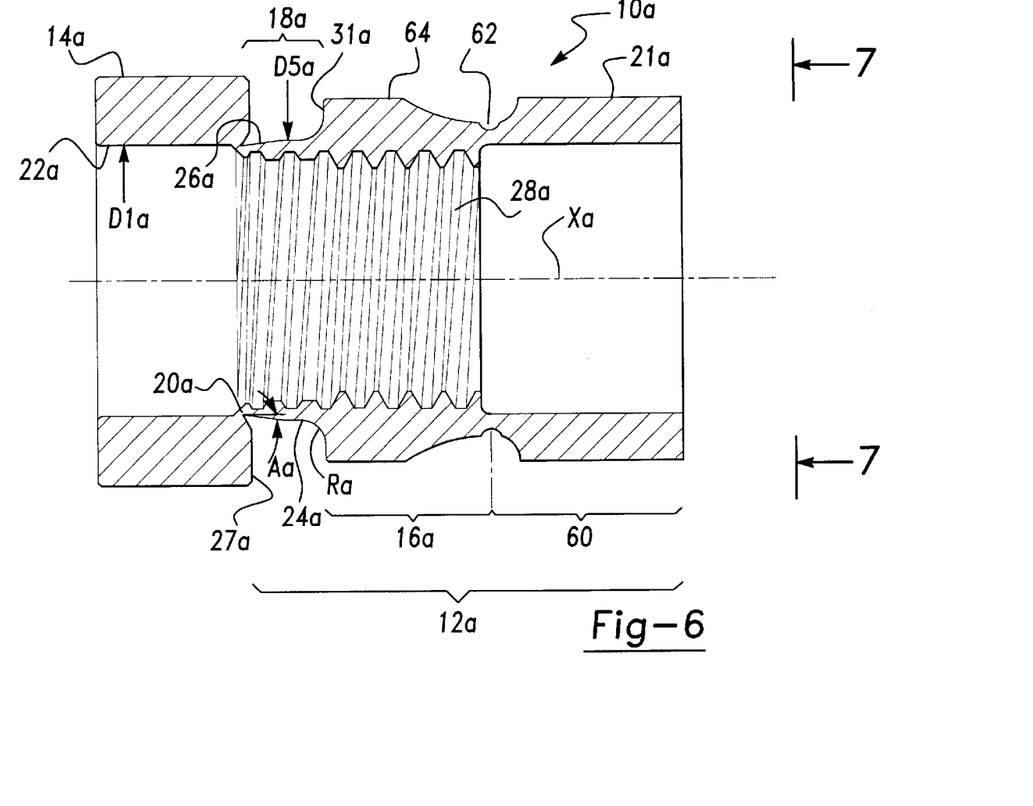
FIG. 6 is a side elevational, sectional view of another form of a one piece nut member having a frangible driving portion at its outer end.
Figure 7:
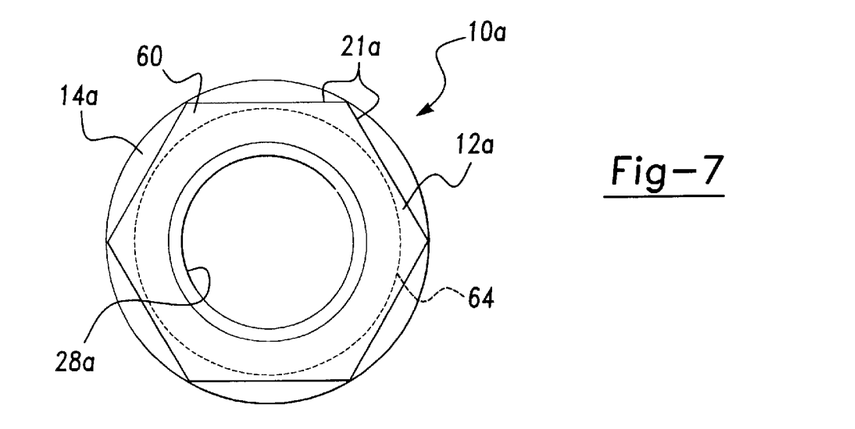
FIG. 7 is an end view of the nut member of FIG. 6 taken generally in the direction of the Arrows 7—7.

A modified form of nut member is shown in FIGS. 6 and 7 in which components similar to like components in the embodiment of FIGS. 1–4 are given the same numeral designation with the addition of the letter postscript "a". Unless described otherwise, the similarly numbered components between the embodiments of FIGS. 1–4 and those of FIGS. 6 and 7 can be considered to be substantially the same and thus the like details will not be repeated for purposes of simplicity.

Looking now to FIGS. 6 and 7, a nut member 10a is shown which is of a one piece construction and includes a nut section 12a, a locking ring section 14a and a frangible driving section 60. The nut section 12a includes a main body portion 16a and a neck portion 18a. In the embodiment of FIGS. 6 and 7 the main body portion 16a is provided with an annular relatively smooth outer surface 64. This is in contrast to the hex shaped outer surface 21 of the main body portion 16 of FIGS. 1–4. The ring section 14a is of an annular configuration having a generally circular cross-section with a smooth through bore 22a of a preselected diameter D1a.

The neck portion 18a has a straight segment 24a of a uniform outside diameter D5a. The straight segment 24a is connected to the main body portion 16a by a fillet radius Ra. A tapered segment 26a has a radially outer surface which extends at an angle Aa relative to the axis Xa of the nut member 10a.

The nut section 12a has a threaded through bore 28a extending through the main body portion 16a and neck portion 18a and can be threadably applied to a bolt, such as the bolt 30 in FIGS. 3 and 4. The driving section 60 is connected to the body portion 16a of the nut section 12a via an annular breakneck groove 62 which is adapted to fracture at a preselected magnitude of torque indicative of the final desired clamp load to be applied to the workpieces being secured together, such as workpieces 46 and 48. Thus the nut member 10a can be threadably secured onto the threaded portion of a bolt, such as bolt 30, and with torque being applied via the hex shaped surface 21a of the frangible driving section 60 to clamp workpieces, such as workpieces 46 and 48, together under a preselected magnitude of clamp load. With increasing torque the frangible rib 20a fractures and the neck portion 18a moves axially into the bore 22a of the locking ring section 14a. As the tapered segment 26a moves farther axially into ring bore 22a the tapered segment 26a is compressed radially inwardly into tight, compressive engagement with the mating threads on a threaded shank portion of a bolt such as shank portion 38 of bolt 30. The application of increasing torque continues until the straight segment 24a is moved into the ring bore 22a. After the straight segment 24a has been moved into the ring bore 22a preferably with confronting surfaces 27a and 31a in engagement, and the desired magnitude of torque has been attained the breakneck groove 62 will fracture severing the driving section 60 from the nut section 12a thereby completing the installation. By utilizing a separate, severable driving section 60 the weight of the main body portion 16a can be reduced resulting in an overall reduction in the combined weight of the sections 14a, 16a and 18a whereby the weight of the fastener assembly after final installation can be reduced by virtue of the reduced weight of the remaining sections 14a, 16a and 18a of nut member 10a. Such a reduction in weight could be significant in aerospace applications.

As previously noted in the embodiment of FIGS. 1–4, the crests of at least some of the threads in the neck portion 18a are truncated for the purposes previously described.

Figure 8:
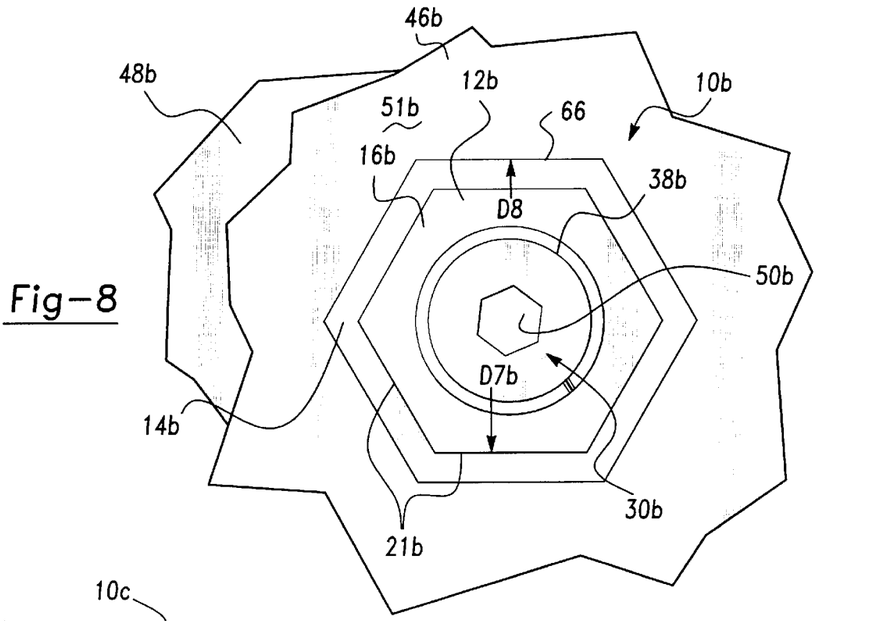
FIG. 8 is an end view, similar to that of FIG. 2, of a modified form of the one piece nut member of FIG. 1 as it would appear, as modified, in the direction of the Arrows 8—8 in FIG. 3.

In FIG. 8 another modified form of nut member is shown in assembly with a bolt for securing workpieces and in which components similar to like components in the embodiment of FIGS. 1–4 are given the same numeral designation with the addition of the letter postscript "b". The nut member 10b is substantially identical to the nut member 10 of FIGS. 1–4 except as described below while the bolt 30b and workpieces 46b and 48b are identical to their counterparts in FIGS. 1–4. Thus the description of these identical details have been omitted for purposes of simplicity.

Thus the nut member 10b is of a one piece construction and includes a nut section 12b and a locking ring section 14b. The nut section 12b is substantially identical to nut section 12 of FIGS. 1–4 and thus includes a main body portion 16b, like body portion 16, and a neck portion, like neck portion 18. In the embodiment of FIG. 8 the main body portion 16b has a hex shaped outer surface 21b, similar to the hex surface 21 of FIG. 2, whereby torque can be applied to the nut member 10b through the nut section 12b. The ring section 14b is of an annular configuration having a smooth through bore, such as bore 22 of FIGS. 1–4. The main difference, however, between the nut member 10b and the nut member 10 is that the outer surface 66 of the ring section 14b of nut member 10b is formed to have a hex shape but of a larger size than that of hex surface 21 on main body portion 16 of nut member 10 and hence larger than the similarly shaped and sized hex surface 21b on main body portion 16b of nut member 10b. Thus the diametrical dimension D8 across the flats of hex surface 66 is greater than the diametrical dimension D7b across the flats of hex surface 21b. As will be seen, the larger, outer hex surface 66 can be used advantageously to provide a preselected magnitude of preload for initial squeeze out of sealant when used between workpieces 46b and 48b.

Thus the nut member 10b is initially installed onto the threaded portion 38b of bolt 30b by torque applied solely to the ring section 14b through the larger, outer hex surface 66. Spinning of the nut member 10b and bolt 30b together within the workpiece bores can be prevented, as noted in the embodiment of FIGS. 1–4, by engagement of the hex shaped bore 50b at the outer end of threaded shank portion 38b of bolt 30b with a similarly shaped rod on an installation tool. As can be seen from FIG. 8, the large hex surface 66 is of a size whereby an enlarged hex socket can pass over the smaller hex surface 21b with adequate clearance.

The nut member 10b is then torqued to a magnitude clamping the workpieces 46b and 48b together at an initial preload and, in the case where sealant, such as that previously described, is employed at a load at which the excess sealant is squeezed out. In this regard the fracture load of the frangible rib, such as frangible rib 20, can be used to determine the load at which the desired initial preload for sealant squeeze out has been attained. By applying this initial preload for sealant squeeze out solely through the larger, outer hex surface 66, the maximum magnitude of such preload applied will be determined by the fracture load of the frangible rib, such as rib 20. Once the frangible rib, such as rib 20, has fractured, no additional load can be transmitted by the operator through the outer hex surface 66. Thus by the utilization of the larger, outer hex surface 66 to apply the initial preload, the magnitude of initial preload can be set at a desired fixed level and at the same time excessive initial preload is avoided. After a prescribed time period sufficient to permit final sealant displacement from squeeze out, additional and final clamp load can be attained by applying additional torque through the smaller hex surface 21b of the nut section 12b. The nut member 10b will then function similarly to that as described for the embodiment of FIGS. 1–4 after fracture of the frangible rib (such as rib 20), with the neck portion (such as neck portion 18) moving fully into the bore (such as bore 22) of the locking ring section 14b.

In some joint applications subject to high loads it may be necessary to provide the neck portion, such as neck portion 18, with a generally greater overall wall thickness and structure for providing the necessary conditions for radial compression. This is illustrated in the form of the nut member shown in FIG. 9 in which components similar to like components in the embodiment of FIGS. 1–4 have been given the same numeral designation with the addition of the letter subscript "c". The nut member 10c is substantially identical to the nut member 10 of FIGS. 1–4 except as described below and thus the description of these identical details have been omitted for purposes of simplicity.

Figure 9:
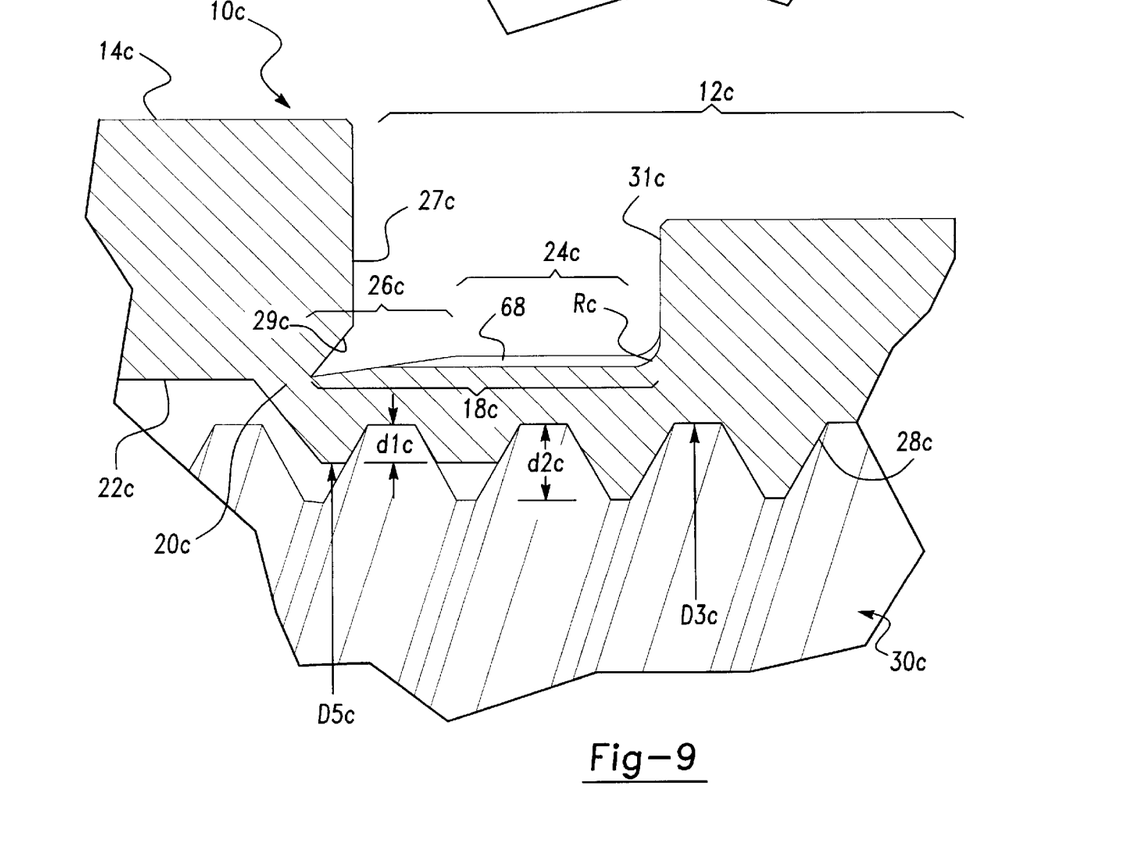
FIG. 9 is a fragmentary sectional view to enlarged scale, similar to FIG. 1A, showing a modified form of the nut member of FIGS. 1–4 in assembly relationship with a bolt and in which the neck portion of the nut member has been provided with a plurality of axial grooves for increased radial compliance.

Thus looking now to FIG. 9, in order to provide the neck portion 18c with sufficient compliance for radial compression as it moves into the ring bore 22c, a plurality of circumferentially spaced, axially extending grooves 68 are provided in the neck portion 18c. This results in a general reduction in total cross-sectional area and in the radial stiffness of the neck portion 18c thereby giving it the necessary compliance while still providing the desired strength level. In addition, in applications where sealant is used between the workpieces being secured the grooves 68 can act as passageways to facilitate flow of excess sealant thereby inhibiting excessive pressure build up.

It should be noted that the number of grooves 68 and their depth can be varied depending upon the specific requirements of different applications. It should also be noted that the grooves 68 could be formed by a rolling procedure similar to that used for forming splines. The crests of the rolled grooves could be subsequently machined to be reduced in size to further reduce the stiffness of the neck portion 18c in compression. It is believed that the grooves 68 should be generally equally circumferentially spaced to provide uniform distribution of the resultant reduction in radial stiffness.

It can also be seen from FIG. 9 that the neck portion 18c is provided with threads truncated to a radial depth d1c at its leading end and at least one complete thread pitch of full radial depth d2c at its trailing end. The noted thread of full radial depth d2c is then located in line with the straight segment 24c of the neck portion 18c. This provides additional tensile strength to the threaded connection between the threads of threaded bore 28c the mating threads of the bolt 30c.

It should be noted that the different features shown in the various embodiments can be incorporated into each other in view of the teachings of the specification. For example the frangible driving structure of section 60 of FIGS. 6 and 7 could be adapted for use in the embodiments of FIGS. 1–5, 8 and 9. Likewise the double hex feature of FIG. 8, in addition to its use with the structure of FIGS. 1–5, can be adapted for use in the embodiments of FIGS. 6, 7 and 9. Also the slotted neck portion 18c of FIG. 9 could be used with the embodiments of FIGS. 1–5, 6 and 7, and 8. In addition it can be seen that in all cases the neck portions, such as neck portions 18, 18a, 18c, can be provided with helical threads of at least around two thread pitches with at least one thread pitch of full radial depth.

In the embodiments of the invention shown, the form of the threads of the threaded shank portion, such as shank portion 38 of bolt 30, can be of the shallow type as shown and described in the U.S. Pat. No. 5,090,852 issued on Feb. 25, 1992 to Richard D. Dixon for High Strength Fastener and Method. Accordingly, the threads of the threaded shank portion, such as shank portion 38, would have root portions which are of a simulated streamlined or elliptical shape as taught in the '582 patent and in this regard the disclosure of that patent is incorporated herein by reference. The nut member, such as nut member 10, would have mating threads of similar contour while including a truncated portion, such as the truncated thread portion in neck portion 18 in the embodiment of FIGS. 1–4, to facilitate initial engagement. In this structure, however, it is believed that the provision of at least one or two thread pitches of complete helical threads of full radial depth in the neck portion may be advantageous.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A fastening system including a bolt member having a shank with a threaded portion and a nut member adapted to be threadably engaged with said threaded shank portion to secure workpieces together at a preselected preload with a preselected magnitude of prevailing torque, said nut member comprising:
a ring section having a ring through bore with a generally axially straight engaging portion at one end of a generally uniform preselected diameter,
a nut section having a nut bore with helical threads formed therein for threadable engagement with said threaded shank portion of the bolt member,
said nut section having a drive portion and a reduced diameter neck portion connected thereto,
said drive portion adapted to be gripped by a tool for applying relative torque between said nut member and the bolt member,
said neck portion having a straight segment with a radially outer surface of a generally uniform diameter connected to a tapered segment with a radially outer surface of varying diameter,
said tapered segment extending between said straight segment and said ring section and terminating in an outer end adapted to be operatively connected to said ring section at said ring bore,
the helical threads formed in said nut bore extending from said drive portion at least partially into said neck portion,
said outer surface of said tapered segment having a diameter at said outer end generally no greater than that of said ring bore and tapering to an increased diameter at said straight segment with said increased diameter being greater than the diameter of said ring bore to provide a preselected maximum interference between the threads of said neck portion and the engaged threads of said threaded shank portion of the bolt member when said neck portion is threadably moved into said ring bore,
said tapered and straight segments adapted to be moved into said ring bore in surface engagement with said ring bore with said straight segment of said neck portion in surface engagement with said straight engaging portion of said bore whereby a radially compressive force is applied between the threads of said neck portion and the engaged threads of said threaded shank portion of the bolt member whereby said nut member will be secured to said threaded shank portion with said preselected magnitude of prevailing torque.

2. The fastening system of claim 1 with said neck portion having helical threads of at least around two thread pitches.

3. The fastening system of claim 1 with said straight segment being generally around 10% to around 75% of the axial length of said neck portion.

4. The fastening system of claim 1 with said neck portion having helical threads for at least around two thread pitches, said straight segment being generally around 10% to around 75% the axial length of said neck portion.

5. The fastening system of claim 1 for securing workpieces together with said ring section having an axially outer radially extending surface adapted to engage a confronting surface of one of the workpieces, said neck portion having an axial length relative to the axial depth of said ring bore whereby engagement of said neck portion with the confronting surface of the associated one of the workpieces is generally precluded.

6. A fastening system including a bolt member having a shank with a threaded portion and a nut member adapted to be threadably engaged with said threaded shank portion to secure workpieces together at a preselected preload with a preselected magnitude of prevailing torque, said nut member comprising:
a ring section having a ring through bore of a generally uniform preselected diameter,
a nut section having a nut bore with helical threads formed therein for threadable engagement with said threaded shank portion of the bolt member,
said nut section having a drive portion and a reduced diameter neck portion connected thereto,
said drive portion adapted to be gripped by a tool for applying relative torque between said nut member and the bolt member,
said neck portion having a straight segment with a radially outer surface of a generally uniform diameter connected to a tapered segment with a radially outer surface of varying diameter,
said tapered segment extending between said straight segment and said ring section and terminating in an outer end adapted to be operatively connected to said ring section at said ring bore,
the helical threads formed in said nut bore extending from said drive portion at least partially into said neck portion,
said outer surface of said tapered segment having a diameter at said outer end generally no greater than that of said ring bore and tapering to an increased diameter at said straight segment with said increased diameter being greater than the diameter of said ring bore to provide a preselected maximum interference between the threads of said neck portion and the engaged threads of said threaded shank portion of the bolt member when said neck portion is threadably moved into said ring bore,
said tapered and straight segments adapted to be moved into said ring bore in surface engagement with said ring bore whereby a radially compressive force is applied between the threads of said neck portion and the engaged threads of said threaded shank portion of the bolt member whereby said nut member will be secured to said threaded shank portion with said preselected magnitude of prevailing torque,
said nut section including a body portion connected to said drive portion by a breakneck groove, said breakneck groove adapted to fracture at a preselected magnitude of torque applied thereto whereby said drive portion will be removed from the remainder of the nut member upon final installation.

7. A fastening system including a bolt member having a shank with a threaded portion and a nut member adapted to be threadably engaged with said threaded shank portion to secure workpieces together at a preselected preload with a preselected magnitude of prevailing torque, said nut member comprising:
a ring section having a ring through bore of a generally uniform preselected diameter,
a nut section having a nut bore with helical threads formed therein for threadable engagement with said threaded shank portion of the bolt member,
said nut section having a drive portion and a reduced diameter neck portion connected thereto, said drive portion adapted to be gripped by a tool for applying relative torque between said nut member and the bolt member, said neck portion having a straight segment with a radially outer surface of a generally uniform diameter connected to a tapered segment with a radially outer surface of varying diameter, said tapered segment extending between said straight segment and said ring section and terminating in an outer end adapted to be operatively connected to said ring section at said ring bore, the helical threads formed in said nut bore extending from said drive portion at least partially into said neck portion, said outer surface of said tapered segment having a diameter at said outer end generally no greater than that of said ring bore and tapering to an increased diameter at said straight segment with said increased diameter being greater than the diameter of said ring bore to provide a preselected maximum interference between the threads of said neck portion and the engaged threads of said threaded shank portion of the bolt member when said neck portion is threadably moved into said ring bore, said tapered and straight segments adapted to be moved into said ring bore in surface engagement with said ring bore whereby a radially compressive force is applied between the threads of said neck portion and the engaged threads of said threaded shank portion of the bolt member whereby said nut member will be secured to said threaded shank portion with said preselected magnitude of prevailing torque, said ring section and said nut section being integrally formed and with said nut member further comprising a frangible rib integrally connecting said neck portion with said ring section and adapted to fracture at a preselected magnitude of torque whereby said nut member can be free running onto said threaded shank portion of the bolt member to clamp the workpieces together at a preselected magnitude of clamp load prior to said frangible rib fracturing and prior to movement of said neck portion into said ring bore.

8. The fastening system of claim 1 with said drive portion having a first inner radially extending surface in confrontation with a second inner radially extending surface on said ring section, said first and second inner surfaces adapted to be engaged with each other after said neck portion has moved fully into said ring bore.

9. The fastening system of claim 7 with said drive portion having a first inner radially extending surface in confrontation with a second inner radially extending surface on said ring section, said first and second inner surfaces adapted to be engaged with each other after said neck portion has moved fully into said ring bore.

10. A fastening system including a bolt member having a shank with a threaded portion and a nut member adapted to be threadably engaged with said threaded shank portion to secure workpieces together at a preselected preload with a preselected magnitude of prevailing torque, said nut member comprising:

a ring section having a ring through bore of a generally uniform preselected diameter, a nut section having a nut bore with helical threads formed therein for threadable engagement with said threaded shank portion of the bolt member, said nut section having a drive portion and a reduced diameter neck portion connected thereto, said drive portion adapted to be gripped by a tool for applying relative torque between said nut member and the bolt member, said neck portion having a straight segment with a radially outer surface of a generally uniform diameter connected to a tapered segment with a radially outer surface of varying diameter, said tapered segment extending between said straight segment and said ring section and terminating in an outer end adapted to be operatively connected to said ring section at said ring bore, the helical threads formed in said nut bore extending from said drive portion at least partially into said neck portion, said outer surface of said tapered segment having a diameter at said outer end generally no greater than that of said ring bore and tapering to an increased diameter at said straight segment with said increased diameter being greater than the diameter of said ring bore to provide a preselected maximum interference between the threads of said neck portion and the engaged threads of said threaded shank portion of the bolt member when said neck portion is threadably moved into said ring bore, said tapered and straight segments adapted to be moved into said ring bore in surface engagement with said ring bore whereby a radially compressive force is applied between the threads of said neck portion and the engaged threads of said threaded shank portion of the bolt member whereby said nut member will be secured to said threaded shank portion with said preselected magnitude of prevailing torque, said ring section and said nut section being integrally formed and with said nut member further comprising a frangible rib integrally connecting said neck portion with said ring section and adapted to fracture at a preselected magnitude of torque whereby said nut member can be free running onto said threaded shank portion of the bolt member to clamp the workpieces together at a preselected magnitude of clamp load prior to said frangible rib fracturing and prior to movement of said neck portion into said ring bore, said drive portion having a first inner radially extending surface in confrontation with a second inner radially extending surface on said ring section, said first and second inner surfaces adapted to be engaged with each other after said neck portion has moved fully into said ring bore, said first inner surface of said drive portion connected to said neck portion with a fillet radius, an annular notch located in said second inner surface generally in line with said frangible rib and extending axially inwardly to substantially provide a clearance with said fillet radius upon engagement of said first and second inner surfaces.

11. A fastening system including a bolt member having a shank with a threaded portion and a nut member adapted to be threadably engaged with said threaded shank portion to secure workpieces together at a preselected preload with a preselected magnitude of prevailing torque, said nut member comprising:

a ring section having a ring through bore of a generally uniform preselected diameter, a nut section having a nut bore with helical threads formed therein for threadable engagement with said threaded shank portion of the bolt member, said nut section having a drive portion and a reduced diameter neck portion connected thereto, said drive portion adapted to be gripped by a tool for applying relative torque between said nut member and the bolt member, said neck portion having a straight segment with a radially outer surface of a generally uniform diameter connected to a tapered segment with a radially outer surface of varying diameter, said tapered segment extending between said straight segment and said ring section and terminating in an outer end adapted to be operatively connected to said ring section at said ring bore, the helical threads formed in said nut bore extending from said drive portion at least partially into said neck portion, said outer surface of said tapered segment having a diameter at said outer end generally no greater than that of said ring bore and tapering to an increased diameter at said straight segment with said increased diameter being greater than the diameter of said ring bore to provide a preselected maximum interference between the threads of said neck portion and the engaged threads of said threaded shank portion of the bolt member when said neck portion is threadably moved into said ring bore, said tapered and straight segments adapted to be moved into said ring bore in surface engagement with said ring bore whereby a radially compressive force is applied between the threads of said neck portion and the engaged threads of said threaded shank portion of the bolt member whereby said nut member will be secured to said threaded shank portion with said preselected magnitude of prevailing torque, said helical threads in said neck portion having at least some thread crests beginning at said outer end which are partially truncated and of lesser radial depth than said helical threads in said drive portion to reduce the resistance of said neck portion to radially inward compression.

12. The fastening system of claim 11 with said truncated threads in said neck portion having thread crests which are in the range of around 25% to around 75% of the depth of the crests of said helical threads in said drive portion.

13. The fastening system of claim 11 with said truncated threads in said neck portion having thread crests which are around 50% of the depth of the crests of said helical threads in said drive portion.

14. The fastening system of claim 11 with said neck portion having at least one helical thread pitch of full radial depth at its inner end.

15. A fastening system including a bolt member having a shank with a threaded portion and a nut member adapted to be threadably engaged with said threaded shank portion to secure workpieces together at a preselected preload with a preselected magnitude of prevailing torque, said nut member comprising:

a ring section having a ring through bore of a generally uniform preselected diameter, a nut section having a nut bore with helical threads formed therein for threadable engagement with said threaded shank portion of the bolt member, said nut section having a drive portion and a reduced diameter neck portion connected thereto, said drive portion adapted to be gripped by a tool for applying relative torque between said nut member and the bolt member, said neck portion having a straight segment with a radially outer surface of a generally uniform diameter connected to a tapered segment with a radially outer surface of varying diameter, said tapered segment extending between said straight segment and said ring section and terminating in an outer end adapted to be operatively connected to said ring section at said ring bore, the helical threads formed in said nut bore extending from said drive portion at least partially into said neck portion, said outer surface of said tapered segment having a diameter at said outer end generally no greater than that of said ring bore and tapering to an increased diameter at said straight segment with said increased diameter being greater than the diameter of said ring bore to provide a preselected maximum interference between the threads of said neck portion and the engaged threads of said threaded shank portion of the bolt member when said neck portion is threadably moved into said ring bore, said tapered and straight segments adapted to be moved into said ring bore in surface engagement with said ring bore whereby a radially compressive force is applied between the threads of said neck portion and the engaged threads of said threaded shank portion of the bolt member whereby said nut member will be secured to said threaded shank portion with said preselected magnitude of prevailing torque, a sealant located between the workpieces and with said ring section and said nut section being integrally formed and with said nut member further comprising a frangible rib integrally connecting said neck portion with said ring section and adapted to fracture at a preselected magnitude of torque whereby said nut member can be free running onto said threaded shank portion of the bolt member to clamp the workpieces together at a preselected magnitude of clamp load prior to said frangible rib fracturing and prior to movement of said neck portion into said ring bore, said ring section having an outer surface of an irregular contour adapted to be gripped by a tool for applying relative torque between said nut member and said bolt member through said ring section and to be torqued to compress the sealant while being torqued to a magnitude at which said frangible rib fractures with additional torque being applied through said drive portion moving said neck portion into said ring bore for final installation.

16. A fastening system including a bolt member having a shank with a threaded portion and a nut member adapted to be threadably engaged with said threaded shank portion to secure workpieces together at a preselected preload with a preselected magnitude of prevailing torque, said nut member comprising:

a ring section having a ring through bore of a preselected diameter, a nut section having a nut bore with helical threads formed therein for threadable engagement with said threaded shank portion of the bolt member, said nut section having a drive portion and a reduced diameter neck portion connected thereto, said drive portion adapted to be gripped by a tool for applying relative torque between said nut member and the bolt member, said neck portion terminating in an outer end adapted to be operatively connected to one end of said ring section at said ring bore, the helical threads formed in said nut bore extending from said drive portion at least partially into said neck portion, the radially outer surface of said neck portion having a diameter relative to that of said ring bore whereby said neck portion can be received into said ring bore with a preselected interference, said helical threads in said neck portion having at least some thread crests beginning at said outer end which are partially truncated and of lesser radial depth than said helical threads in said drive portion to reduce the resistance of said neck portion to radially inward compression as it is moved into said ring bore, said outer surface of said neck portion and the surface of said ring bore being operatively engageable whereby said neck portion is compressed radially inwardly as it is moved into said ring bore to provide a preselected maximum interference between the threads of said neck portion and the engaged threads of said threaded shank portion of the bolt member when said neck portion is threadably moved into said ring bore whereby a radially compressive force is applied between the threads of said neck portion and the engaged threads of said threaded shank portion whereby said nut member will be secured to the threaded bolt portion with a preselected magnitude of prevailing torque.

17. The fastening system of claim 16 with said truncated threads in said neck portion having thread crests which are in the range of around 25% to around 75% of the depth of the crests of said helical threads in said drive portion.

18. The fastening system of claim 16 with said truncated threads in said neck portion having thread crests which are around 50% of the depth of the crests of said helical threads in said drive portion.

19. The fastening system of claim 16 with said neck portion having at least one thread pitch of full radial depth at its inner end.

20. The fastening system of claim 16 with said nut section including a body portion connected to said drive portion by a breakneck groove, said breakneck groove adapted to fracture at a preselected magnitude of torque applied thereto whereby said drive portion will be removed from the remainder of the nut member upon final installation.

21. The fastening system of claim 16 with said ring section and said nut section being integrally formed and with said nut member further comprising a frangible rib integrally connecting said neck portion with said ring section and adapted to fracture at a preselected magnitude of torque whereby said nut member can be free running onto said threaded shank portion of the bolt member to clamp the workpieces together at a preselected magnitude of clamp load prior to said frangible rib fracturing and prior to movement of said neck portion into said ring bore.

22. The fastening system of claim 16 with said ring section and said nut section being integrally formed and with said nut member further comprising a frangible rib integrally connecting said neck portion with said ring section and adapted to fracture at a preselected magnitude of torque whereby said nut member can be free running onto said threaded shank portion of the bolt member to clamp the workpieces together at a preselected magnitude of clamp load prior to said frangible rib fracturing and prior to movement of said neck portion into said ring bore, said drive portion having a first inner radially extending surface in confrontation with a second inner radially extending surface on said ring section, said first and second inner surfaces adapted to be engaged with each other after said neck portion has moved fully into said ring bore.

23. The fastening system of claim 16 with a sealant located between the workpieces and with said ring section and said nut section being integrally formed and with said nut member further comprising a frangible rib integrally connecting said neck portion with said ring section and adapted to fracture at a preselected magnitude of torque whereby said nut member can be free running onto said threaded shank portion of the bolt member to clamp the workpieces together at a preselected magnitude of clamp load prior to said frangible rib fracturing and prior to movement of said neck portion into said ring bore, said ring section having an outer surface of an irregular contour adapted to be gripped by a tool for applying relative torque between said nut member and said bolt member through said ring section and to be torqued to compress the sealant while being torqued to a magnitude at which said frangible rib fractures with additional torque being applied through said drive portion moving said neck portion into said ring bore for final installation.

24. A fastening system including a bolt member having a shank with a threaded portion and a nut member adapted to be threadably engaged with said threaded shank portion to secure workpieces together at a preselected preload with a preselected magnitude of prevailing torque with a sealant located between the workpieces, said nut member comprising:

a ring section having a ring through bore, a nut section having a nut bore with helical threads formed therein for threadable engagement with said threaded shank portion of the bolt member, said nut section having a drive portion and a reduced diameter neck portion connected thereto, said drive portion adapted to be gripped by a tool for applying relative torque between said nut member and said threaded shank portion of the bolt member, the helical threads formed in said nut bore extending from said drive portion at least partially into said neck portion, the outer surface of said neck portion having a diameter at said outer end generally no greater than that of said ring bore at said one end of said ring section, said outer surface of said neck portion and the surface of said ring bore selected to define a generally progressively reduced diameter therebetween whereby said neck portion is compressed radially inwardly as it is moved into said ring bore to provide a preselected maximum interference between the threads of said neck portion and the engaged threads of said threaded shank portion of the bolt member when said neck portion is threadably moved into said ring bore whereby a radially compressive force is applied between the threads of said neck portion and the engaged threads of said threaded shank portion whereby said nut member will be secured to said threaded shank portion with a preselected magnitude of prevailing torque, said ring section and said nut section being integrally formed and with said nut member further comprising a frangible rib integrally connecting said neck portion with said ring section and adapted to fracture at a preselected magnitude of torque whereby said nut member can be free running onto the bolt member to clamp the workpieces together at a preselected magnitude of clamp load prior to said frangible rib fracturing and prior to movement of said neck portion into said ring bore, said ring section having an outer surface of an irregular contour adapted to be gripped by a tool for applying relative torque between said nut member and the bolt member through said ring section and to be torqued to compress the sealant while being torqued to a magnitude at which said frangible rib fractures with additional torque being applied through said drive portion moving said neck portion into said ring bore for final installation.

25. The fastening system of claim 24 with said ring through bore of said ring section being of a generally uniform preselected diameter, said neck portion having a straight segment with a radially outer surface of a generally uniform diameter connected to a tapered segment with a radially outer surface of varying diameter, said tapered segment extending between said straight segment and said ring section and terminating in said outer end, said outer surface of said tapered segment having a diameter at said outer end generally equal to that of said ring bore and tapering to the diameter of said straight segment with such diameter being greater than the diameter of said ring bore to provide a preselected maximum interference between the threads of said neck portion and the engaged threads of said threaded shank portion of the bolt member when said neck portion is threadably moved into said ring bore, said straight segment adapted to be threadably moved into said ring bore to provide surface engagement with said ring bore whereby a radially compressive force is applied between the threads of said neck portion and the engaged threads of said threaded shank portion whereby said nut member will be secured to said threaded shank portion with a preselected magnitude of prevailing torque.

26. The fastening system of claim 24 with said helical threads in said neck portion having thread crests which are at least partially truncated and of lesser radial depth than said helical threads in said drive portion to reduce the resistance of said neck portion to radially inward compression, said truncated threads in said neck portion having thread crests which are in the range of around 25% to around 75% of the depth of the crests of said helical threads in said drive portion.

27. The fastening system of claim 24 with said helical threads in said neck portion having thread crests which are at least partially truncated and of lesser radial depth than said helical threads in said drive portion to reduce the resistance of said neck portion to radially inward compression, said truncated threads in said neck portion having thread crests which are around 50% of the depth of the crests of said helical threads in said drive portion.

28. The fastening system of claim 24 with said nut section including a body portion connected to said drive portion by a breakneck groove, said breakneck groove adapted to fracture at a preselected magnitude of torque applied thereto whereby said drive portion will be removed from the remainder of the nut member upon final installation.

29. A fastening system including a bolt member having a shank with a threaded portion and a nut member adapted to be threadably engaged with said threaded shank portion to secure workpieces together at a preselected preload with a preselected magnitude of prevailing torque, said nut member comprising:

a ring section having a ring through bore of a generally uniform preselected diameter to define a generally straight cylindrical surface, a nut section having a nut bore with helical threads formed therein for threadable engagement with said threaded shank portion of the bolt member, said nut section having a drive portion and a reduced diameter neck portion connected thereto, said drive portion adapted to be gripped by a tool for applying relative torque between said nut member and the bolt member, said neck portion having a straight segment with a radially outer surface of a generally uniform diameter connected to a tapered segment with a radially outer surface of varying diameter, said tapered segment extending between said straight segment and said ring section and terminating in an outer end connected to said ring section at said ring bore by a frangible rib, said ring section and said nut section being integrally formed and with said frangible rib integrally connecting said neck portion with said ring section and adapted to fracture at a preselected magnitude of torque whereby said nut member can be free running onto said threaded shank portion of the bolt member to clamp the workpieces together at a preselected magnitude of clamp load prior to said frangible rib fracturing and prior to movement of said neck portion into said ring bore, said drive portion having a first inner radially extending surface in confrontation with a second inner radially extending surface on said ring section, said first and second inner surfaces adapted to be engaged with each other after said neck portion has moved fully into said ring bore, the helical threads formed in said nut bore extending from said drive portion at least partially into said neck portion, said outer surface of said tapered segment having a diameter at said outer end generally equal to that of said ring bore and tapering to the diameter of said straight segment with such diameter being greater than the diameter of said ring bore to provide a preselected maximum interference between the threads of said neck portion and the engaged threads of said threaded shank portion of the bolt member when said neck portion is threadably moved into said ring bore, said straight segment adapted to be threadably moved into said ring bore to provide surface engagement with said straight cylindrical surface of said ring bore whereby a radially compressive force is applied between the threads of said neck portion and the engaged threads of said threaded shank portion whereby said nut member will be secured to said threaded shank portion with a preselected magnitude of prevailing torque, said helical threads in said neck portion having thread crests which are at least partially truncated and of lesser radial depth than said helical threads in said drive portion to reduce the resistance of said neck portion to radially inward compression.

30. The fastening system of claim 29 for securing workpieces together with said ring section adapted to engage a confronting surface of one of the workpieces, said neck portion having an axial length generally no greater than the axial depth of said ring bore whereby engagement of said neck portion with the confronting surface of the associated one of the workpieces is generally precluded.

31. The fastening system of claim 29 for securing workpieces together over a preselected grip range with the grip range being defined as the difference between the maximum and minimum total thicknesses of workpieces to be secured by a common one of said bolt and nut members, said bolt member having an enlarged head at one end of said bolt shank adapted to engage a surface of one of the workpieces with said ring section adapted to engage a confronting surface of another of the workpieces, said bolt shank having a smooth shank portion generally extending between said bolt head and said threaded shank portion, said smooth shank portion being of a length to extend substantially to the confronting surface of the other of the workpieces when the workpieces are of the maximum total thickness and to extend past the confronting surface of the other of the workpieces by a predetermined length when the workpieces are of the minimum total thickness, said neck portion having an axial length less than the axial depth of said ring section whereby engagement of said outer end of said neck portion with the confronting end of said smooth shank portion is inhibited.

32. The fastening system of claim 29 with said neck portion having a plurality of circumferentially oriented axially extending grooves for providing a preselected radial compliance of said neck portion to facilitate radial compression thereof as said neck portion is moved into said ring bore.

33. The fastening system of claim 29 with said threaded portion of said bolt member having a generally axially extending slot therein to receive material of said neck portion of said nut member as said neck portion is radially compressed into the threads of said threaded portion of said bolt member to provide a lock to resist loosening of said nut member from said bolt member, said slot extending generally in quadrature to the helix angle of the threads in said threaded portion.

34. The fastening system of claim 29 with said bolt member having an irregularly shaped bore at the end of said threaded shank portion, said irregularly shaped bore adapted to be engaged by a similarly shaped rod member on the tool whereby spinning of said bolt member together with said nut member during the application of torque is inhibited.

* * * * *